United States Patent Office 3,227,718
Patented Jan. 4, 1966

---

3,227,718
NOVEL ANTHELMINTIC AGENTS AND PROCESS FOR PRODUCING THE SAME
Jürgen Johannis, Ernst Schraufstätter, Reimer Strufe, and Rudolf Gönnert, Wuppertal-Elberfeld, and Wilhelm Stendel, Wuppertal-Vohwinkel, Germany, assignors to Farbenfabriken Bayer Aktiengesellschaft, Leverkusen, Germany, a corporation of Germany
No Drawing. Filed Dec. 4, 1962, Ser. No. 242,193
Claims priority, application Germany, Dec. 7, 1961, F 35,485
5 Claims. (Cl. 260—268)

The present invention relates, in general, to novel anthelmintic agents and to a process for producing the same. More particularly, the invention contemplates the provision of new piperazine salts of halo-nitrosalicyl-anilides which have been found to be extremely effective as anthelmintic agents in the treatment of tapeworms, ascarides and hookworms.

It has been established heretofore that 5,2'-dichloro-4'-nitrosalicyl-anilide possesses effectiveness against tapeworms (Arzneimittelforschung, 10, 881, 1960). It was also known heretofore that piperazine and its salts were effective against oxyures and ascarides.

The present invention is based on our discovery that piperazine salts of halo-nitrosalicyl-anilides of the following general formula:

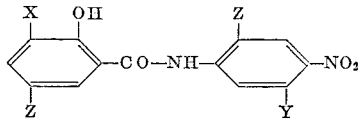

wherein X represents hydrogen, halogen or a lower alkyl radical; Y represents a hydrogen or halogen atom; and Z represents chlorine, bromine or iodine, are extremely active not only against tapeworms and ascarides, but also exhibit surprisingly good activity against hookworms.

The novel compounds of the invention can be used in veterinary medicine as well as in human medicine in the form of powders, tablets, elixirs or pastes.

In the production of the compounds of the invention, piperazine is reacted with a di- or trihalo-nitrosalicyl-anilide of the foregoing formula preferably in the presence of a diluent or solvent. The invention may be best understood by reference to the following specific examples illustrating the preparation of a representative group of the compounds of the invention:

Example I

Twenty-four (24) grams of 5,2'-dichloro-4'-nitrosalicyl-anilide were dissolved in 500 cubic centimeters of methyl ethyl ketone and treated with a solution consisting of 5 grams of piperazine in 200 cubic centimeters of alcohol. The resulting piperazine salt of 5,2'-dichloro-4'-nitrosalicyl-anilide which was precipitated was separated by suction filtration and washed with a small quantity of methyl ethyl ketone. The resultant product, recovered after drying in a yield of 27.5 grams had a melting point of 260° C.

Example II 5,2'-dichloro-4'-nitrosalicyl-anilide, in amount of 240 grams, and 60 grams of piperazine were thoroughly kneaded for several hours in a kneading machine. The resultant mixture was then thoroughly moistened with a small quantity of acetone, separated by suction filtration, and finally washed with acetone. The resultant product was analyzed and found to be identical with that obtained pursuant to the synthesis described in Example I.

Example III

In the same manner as described in Example I, 3,5,2'-trichloro-4'-nitrosalicyl-anilide (obtained from 3,5-dichlorosalicylic acid and 2-chloro-2-nitraniline by means of $PCl_3$; M.P. 226° C.) was reacted with piperazine to yield the corresponding piperazine salt of melting point 216° C.

Example IV

In the same manner as described in Example I, 5-chloro-2'-nitrosalicyl-anilide (obtained from 5-chlorosalicylic acid and 2-iodo-4-nitraniline by means of $PCl_3$; M.P. 216° C.) was reacted with piperazine to yield the corresponding piperazine salt of melting point 232° C.

Example V

In the same manner as described in Example I, 5,2'-dibromo-4'-nitrosalicyl-anilide (obtained from 5-bromosalicylic acid and 2-bromo-4-nitraniline by means of $PCl_3$; M.P. 242° C.) was reacted with piperazine to yield the corresponding piperazine salt of melting point 249° C.

We claim:
1. A compound consisting of the piperazine salt of halo-nitrosalicyl-anilide represented by the formula:

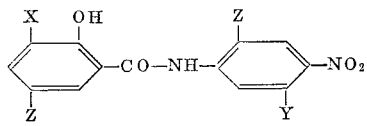

wherein X is a member selected from the group consisting of hydrogen, halogen and lower alkyl radicals; Y is a member selected from the group consisting of hydrogen and halogen atoms; and Z is a member selected from the group consisting of chlorine, bromine and iodine.

2. The piperazine salt of 5,2'-dichloro-4'-nitrosalicyl-anilide.
3. The piperazine salt of 3,5,2'-trichloro-4'-nitrosalicyl-anilide.
4. The piperazine salt of 5-chloro-2'-nitrosalicyl-anilide.
5. The piperazine salt of 5,2'-dibromo-4'-nitrosalicyl-anilide.

References Cited by the Examiner

UNITED STATES PATENTS

| | | | |
|---|---|---|---|
| 2,799,617 | 7/1957 | Forrest et al. | 167—55 |
| 2,850,426 | 9/1958 | Hereld | 167—55 |
| 2,881,157 | 4/1959 | O'Neill | 260—268 |
| 2,969,365 | 1/1961 | Levis | 260—268 |
| 2,980,681 | 4/1961 | Short et al. | 260—268 |
| 3,004,028 | 10/1961 | Dolliver et al. | 260—268 |
| 3,005,821 | 10/1961 | Hayao | 260—268 |
| 3,079,297 | 2/1963 | Schraufstatter et al. | 260—559 X |
| 3,112,067 | 12/1963 | Strufe | 260—559 X |

FOREIGN PATENTS 356,756    10/1961    Switzerland.

OTHER REFERENCES

Arzneimittelforschung, vol. 10, page 881 (1960).
Burger, Medicinal Chemistry, pp. 1064–1066, Interscience Publishers, Inc., New York (1960).
Schraufstatter et al.: Z. Naturforsch, vol. 166, No. 2, pp. 95–108 (1961).

NICHOLAS S. RIZZO, Primary Examiner

IRVING MARCUS, Examiner.